Patented Jan. 12, 1954

2,666,048

UNITED STATES PATENT OFFICE 2,666,048

SEPARATION OF LOW MOLECULAR WEIGHT HYDROCARBONS FROM HYDROCARBON MIXTURES WITH A COMPLEXING AGENT

James W. Fitzwilliam, Beacon, and George B. Arnold, Glenham, N. Y., assignors to The Texas Company, New York, N. Y., a corporation of Delaware No Drawing. Application August 10, 1949, Serial No. 109,614

2 Claims. (Cl. 260—96.5)

This invention relates to a process for the separation of low molecular weight constituents from oil such as from mineral oil or fractions thereof by treatment with an organic agent such as urea.

Broadly the invention concerns a process for separation of low molecular weight constituents from oil by treatment with an organic complexing agent having the structure:

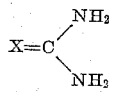

where X may be either oxygen or sulfur. Examples of effective compounds or agents are urea, thiourea, and derivatives thereof which are capable of forming with paraffin hydrocarbons, solid crystalline complex compounds readily separable from the oil at ordinary temperatures.

More specifically, the invention concerns separating $C_7$ and lower molecular weight hydrocarbons from hydrocarbon mixtures containing them with a complexing agent of the foregoing character at temperatures in the range of normal room temperature and higher and forming complexes which are stable at such temperatures.

Normal paraffin hydrocarbons having 9 and more carbon atoms per molecule form with urea, crystalline complexes that are relatively stable at normal room temperature, that is the resulting complex can be readily separated from the liquid constituents of the treated hydrocarbon mixture by settling, centrifuging or filtering, etc. However, it appears that complexes formed between urea and straight chain paraffin hydrocarbons having 2 to 7 carbon atoms per molecule do not exist in stable crystalline form except at temperatures substantially below normal room temperature. In other words, to obtain stable crystalline complexes with these low molecular weight hydrocarbons it is necessary to resort to cooling to temperatures well below room temperature so as to obtain complexes that can be separated from the liquid phase by settling, centrifuging or filtering. This is disadvantageous in commercial operations because it involves refrigeration which is costly.

On the other hand, it appears that complexes formed with relatively long chain paraffin hydrocarbons are stable at normal room temperature. Moreover, it appears that the presence of such long chain hydrocarbons in the complex will permit retaining therein at least substantial amounts of the low molecular weight hydrocarbons. By having paraffinic hydrocarbons sufficiently long in chain length present in a complex containing low molecular weight short chain paraffins, a crystalline complex results which is sufficiently stable at normal room temperature to facilitate separation therefrom.

Accordingly, the present invention involves adding to a normally liquid hydrocarbon mixture or light oil containing the aforesaid low molecular weight hydrocarbons, a waxy substance such as normally solid paraffins or wax which enters into complex formation with the complexing agent at ordinary room temperature or higher. The resulting crystalline complex comprises a mixture of the added long chain paraffins and the relatively short chain hydrocarbon constituents of the feed oil which it is desired to separate therefrom. The presence of the long chain waxy hydrocarbons in the complex thus exerts a stabilizing effect so that the low molecular weight hydrocarbons in question remain in the complex when separated from the liquid phase at ordinary temperatures.

By way of example, a naphtha fraction of petroleum containing low molecular weight paraffin hydrocarbons of less than 8 carbon atoms per molecule is blended with normally solid paraffins in a proportion ranging from about .1 to 2 parts by weight of normally solid paraffin to 1 part by weight of low molecular weight hydrocarbon constituents of the feed oil. The normally solid paraffin may comprise a normal paraffin or a mixture of normal paraffin hydrocarbons having from about 12 to 45 carbon atoms per molecule and preferably about 20 carbon atoms per molecule. The resulting blend is charged to a mixer of conventional type maintained at a temperature, for example, in the range of about 70 to 100 or 125° F.

The complexing agent such as urea is charged to the mixer or, if desired, may be added to the oil before introduction to the mixer. The urea is added in a proportion amounting to about 5 lbs. per lb. of low molecular weight hydrocarbon constituents plus wax hydrocarbons. Thus, sufficient urea is added to complex not only the added hydrocarbons but also the low molecular weight hydrocarbon constituents of the feed which it is desired to separate therefrom.

A polar solvent liquid is charged to the mixer. The solvent liquid may comprise, for example, a low molecular weight aliphatic alcohol such as methanol or ethanol. Other alcohols may be used but usually it is desirable to select an alcohol in the range 1 to about 5 carbon atoms per molecule. However, water or other polar liquids capable of dissolving urea may be used, as for example ketones.

The complex formation is facilitated by the presence of a small amount of the polar liquid. The resulting crystalline complex, in the case of separating paraffin hydrocarbons from mixtures containing them by treatment with urea consists of approximately 25% paraffins and 75% urea by weight. The crystalline structure appears to involve a hexagonal system and it may be decomposed by heating to temperatures in the range about 150 to 180° F. or higher.

The amount of polar solvent liquid required to permit the complex formation usually ranges from about 1 or 2% to about 5 or even 10% by weight of the feed oil although it is contemplated that either smaller or larger amounts may be used.

The resulting mixture is subjected to thorough agitation in the mixing vessel at the aforesaid temperature and thereafter allowed to stand whereupon the resulting crystalling complex separates from the liquid phase. The liquid phase may be removed by decantation without reduction in temperature. Instead of settling, the agitated mixture may be subjected to centrifuging or filtering to separate the crystalline complex from the liquid phase.

Thus, the liquid phase obtained as a filtrate will comprise the main body of hydrocarbons which do not enter into complex formation with urea. These hydrocarbons will comprise branched chain paraffin hydrocarbons and non-paraffin hydrocarbons. Some polar solvent liquid as well as some urea will be retained in the filtrate. Accordingly, the filtrate is passed to a suitable solvent and recovery system wherein the residual solvent and urea may be separated from the hydrocarbons.

For example, the residual urea may be scrubbed or washed from the hydrocarbons or otherwise removed. The hydrocarbons may be subjected to fractionation so as to separate them into desired fractions including low molecular weight fractions.

The crystalline complex material separated from the liquid phase may be subjected to heating alone to break the complex or may be heated to about 150 or 180° F. in the presence of an added or recycled quantity of solvent so that the complex breaks down into an oil phase comprising the aforesaid low molecular weight and added wax hydrocarbons from the higher molecular weight wax hydrocarbons mixed with some solvent and a solvent phase containing urea. These phases are separated by decantation. The solvent is recovered by distillation from the oil phase leaving the desired low molecular weight hydrocarbons mixed with the added wax hydrocarbons. The low molecular weight hydrocarbons can then be distilled readily from the higher molecular weight wax hydrocarbons.

The solvent phase containing the recovered urea may be treated so as to remove part of the solvent, for example, by distillation thereby forming a concentrate of urea in solvent liquid which later is recycled either to the aforesaid mixer or added directly to fresh feed oil. If desired a portion of the crystalline complex initially separated from the oil may be recycled for mixing with fresh feed oil.

The process may have application to the treatment of oils derived from other than petroleum sources. It may be used to effect separation of normal paraffins from non-paraffinic hydrocarbons such as aromatics and naphthene hydrocarbons.

Obviously many modifications and variations of the invention, as hereinbefore set forth, may be made without departing from the spirit and scope thereof, and therefore only such limitations should be imposed as are indicated in the appended claims.

We claim:

1. In the separation of low molecular weight hydrocarbons containing between 2 and 7 carbon atoms per molecule from a substantially wax-free liquid hydrocarbon mixture containing said $C_2$ to $C_7$ hydrocarbons in admixture with normally liquid hydrocarbons by contact with an organic compound capable of forming a crystalline complex with said low molecular weight hydrocarbons and selected from the group consisting of urea and thiourea, said complex being relatively unstable at temperatures in the range of normal room temperature and higher, the method which comprises subjecting said $C_2$ to $C_7$ hydrocarbon-containing mixture to contact with said agent in the presence of an added normally solid paraffin hydrocarbon, effecting said contact at a temperature between 70 and 125° F. and in the presence of at least a small amount of a polar solvent liquid, forming a crystalline complex comprising said low molecular weight hydrocarbons, separating said complex from said mixture at a temperature between 70 and 125° F. and recovering said low molecular weight hydrocarbons from said complex.

2. The method according to claim 1 in which said added solid paraffin comprises 0.1 to 2 parts by weight of said $C_2$ to $C_7$ hydrocarbon content of said mixture.

JAMES W. FITZWILLIAM.
GEORGE B. ARNOLD.

References Cited in the file of this patent

UNITED STATES PATENTS

| Number | Name | Date |
|---|---|---|
| 2,499,820 | Fetterly | Mar. 7, 1950 |
| 2,520,715 | Fetterly | Aug. 29, 1950 |
| 2,549,372 | Fetterly | Apr. 17, 1951 |

OTHER REFERENCES

Bengen, German patent application O. Z. 12,438 (March 18, 1940), U. S. publication date May 22, 1946.